United States Patent [19]

Speaker

[11] 3,945,485

[45] Mar. 23, 1976

[54] TRAY CONVEYING APPARATUS
[75] Inventor: Richard L. Speaker, Hartford, Wis.
[73] Assignee: Speaker Motion Systems, Inc., Milwaukee, Wis.
[22] Filed: June 12, 1974
[21] Appl. No.: 478,726

[52] U.S. Cl. ................................ 198/155; 198/148
[51] Int. Cl.² ........................................ B65G 17/00
[58] Field of Search .......... 198/155, 158, 145, 146, 198/147, 148; 214/307, 62 R, 62 A; 220/83

[56] References Cited
UNITED STATES PATENTS

| | | | |
|---|---|---|---|
| 416,393 | 12/1889 | Bogusch | 105/263 |
| 1,118,738 | 11/1914 | Carroll | 220/83 |
| 2,648,423 | 8/1953 | Black | 198/155 X |
| 3,150,763 | 9/1964 | Immesberger | 198/155 X |
| 3,167,192 | 1/1965 | Harrison | 198/155 X |

FOREIGN PATENTS OR APPLICATIONS

| | | | |
|---|---|---|---|
| 1,208,893 | 10/1970 | United Kingdom | 198/155 |

Primary Examiner—Richard A. Schacher
Attorney, Agent, or Firm—Andrus, Sceales, Starke & Sawall

[57] ABSTRACT

A conveyor includes a plurality of carriages with a longitudinally tilted tray having an end stop wall to support a load. Each tray is longitudinally divided into a pair of side-by-side tray members which are individuall pivotally mounted by bushings on a shaft. Similar bushings are provided on the shaft between the mounting bushings to provide a continuous circular closing surface immediately adjacent to the lower edges of the tray members. Each of the tray members, in particular, extends upwardly as a continuous surface having a first inclined portion merging with a second outwardly inclined portion. The outermost upper surface is provided with a stepped construction to provide a plurality of interlocking load portions each having a generally vertical wall merging with a generally horizontal wall.

19 Claims, 5 Drawing Figures

TRAY CONVEYING APPARATUS

BACKGROUND OF THE INVENTION

This invention relates to a split tray conveying unit and particularly to such a unit for selectively distributing of individual loads from a common loading means to a plurality of different receiving means.

Various distributing and sorting devices have been employed in the merchandising and processing of various articles and parcels. A particularly satisfactory conveying mechanism for receiving of articles at a central location and distributing thereof to a plurality of different locations is disclosed in Applicant's copending application entitled "CONVEYING APPARATUS INCLUDING TILTING SUPPORT STRUCTURES" which was filed on Apr. 10, 1972 with Ser. No. 242,330, and is assigned to the same assignee as the present application. As more fully disclosed therein, each of the tray units is formed as a split member having a pair of adjacent side-by-side tray members secured at the lower edges to a pivot support on a movable carriage. Releasable latch means on the carriage and the tray members support the tray members for transport in a generally V-shaped configuration. To drop a load, an appropriate tray member is released and drops downwardly to form a sliding extension of the opposite inclined tray member to thereby provide for automatic gravity discharge of the load.

Although such a unit provides a highly improved conveying mechanism, consideration must be given to maintain the lower adjacent edges of the tray members properly spaced to prevent movement of the load down between the tray members and to provide a continuous, smooth discharge surface. Further, the double inclined tray members could highly contribute to the successful operation but care must also be taken to ensure proper location and maintaining of the loads during the transport.

SUMMARY OF THE PRESENT INVENTION

The present invention is particularly directed to an improved split tray conveying structure providing improved support of the load during transport while maintaining reliable discharge of the load by the release and dropping of the one tray member relative to the other.

Generally, in accordance with the present invention, the tray structure includes a pair of side-by-side tray members pivotally connected to the carriage and tilted to define a generally V-shaped load support. Each of the tray members extends upwardly from the pivot support to an outer second inclined or portion as in the previously identified application. The outer portion of each tray member, however, is provided with a plurality of longitudinal, parallel step-like offset portions to provide an improved loading carrying characteristic. The lowermost end of each tray member is pivotally secured to a pivot support employing tubular bushing means which extend the complete length of the tray members to create a continuous closing surface located immediately adjacent to the lower edges of the tray members. Thus, in a preferred and novel construction each of the tray members is similarly supported by a pair of longitudinally spaced support brackets secured to the underside of the tray member. Each of the brackets extends downwardly with the lower end provided with pivot bushings journaled on the pivot shaft or support shaft. Spacing bushings on the shaft fill the space between the pivot bushings of the intermediate longitudinally spaced brackets to maintain the continuous, cylindrical closure surface. Each of the tray members has its lower end located in closely spaced relation to the cylindrical surface and preferably include a very slight vertical wall portion or lips merging into the tray support portion with a minimal opening or spacing between the lips of each pair of tray members. The surfaces are spaced such that there is no interference between the tray members as they move between the released and the reset load carrying position.

Further, the release mechanism includes an integral extension of the mounting bracket which extends downwardly and terminates at the lower end in a latching member forming a part of a notching and pin type releasable latch. Thus, the lower end of the arm may be formed with a downwardly opening notch. The latch mechanism includes a separate mounting bracket releasably secured to the U-shaped carriage structure. A pair of release arms are mounted on a longitudinally extended pivot shaft with spring means oppositely biasing the arms into a standby position. The arms extend across the pivot shaft with a latching roller aligned with the notch of the opposite tray bracket. The opposite end of the arm extends outwardly into the alignment with the trip mechanism such that upward pivoting of the arm releases the interconnected, latched tray member which drops to provide the desired gravity discharge. The latch arms preferably include a kicker cam which engages the tray bracket and positively forces the bracket from the latch engagement with the latch pin roller. As in the previous application, a suction cup bumper arrangement is preferably provided to absorb the bounce and recoil characteristics. In accordance with the present invention, the bumper unit is interconnected to the supporting bracket and thus moves with the dropping tray. The arrangement of the tray and suction cups is so arranged that the moving suction cup will move into engagement with the supporting bracket of the opposite tray member to thereby provide a slight bump to the opposite tray member further assisting in the load discharge.

Applicant found that the improved mounting in tray construction not only contributes to improved life in operation, but is particularly adapted to practical mass production controls. The present invention thus provides a highly improved tray structure for conveying devices in particularly high speed sorting apparatus.

BRIEF DESCRIPTION OF THE DRAWINGS

The drawings furnished herewith illustrate preferred constructions of the present invention in which the above advantages and features are clearly disclosed as well as others which will be readily understood from the following description, of the illustrated embodiment.

In the drawings.

DESCRIPTION OF THE ILLUSTRATED EMBODIMENT

Figure 1:
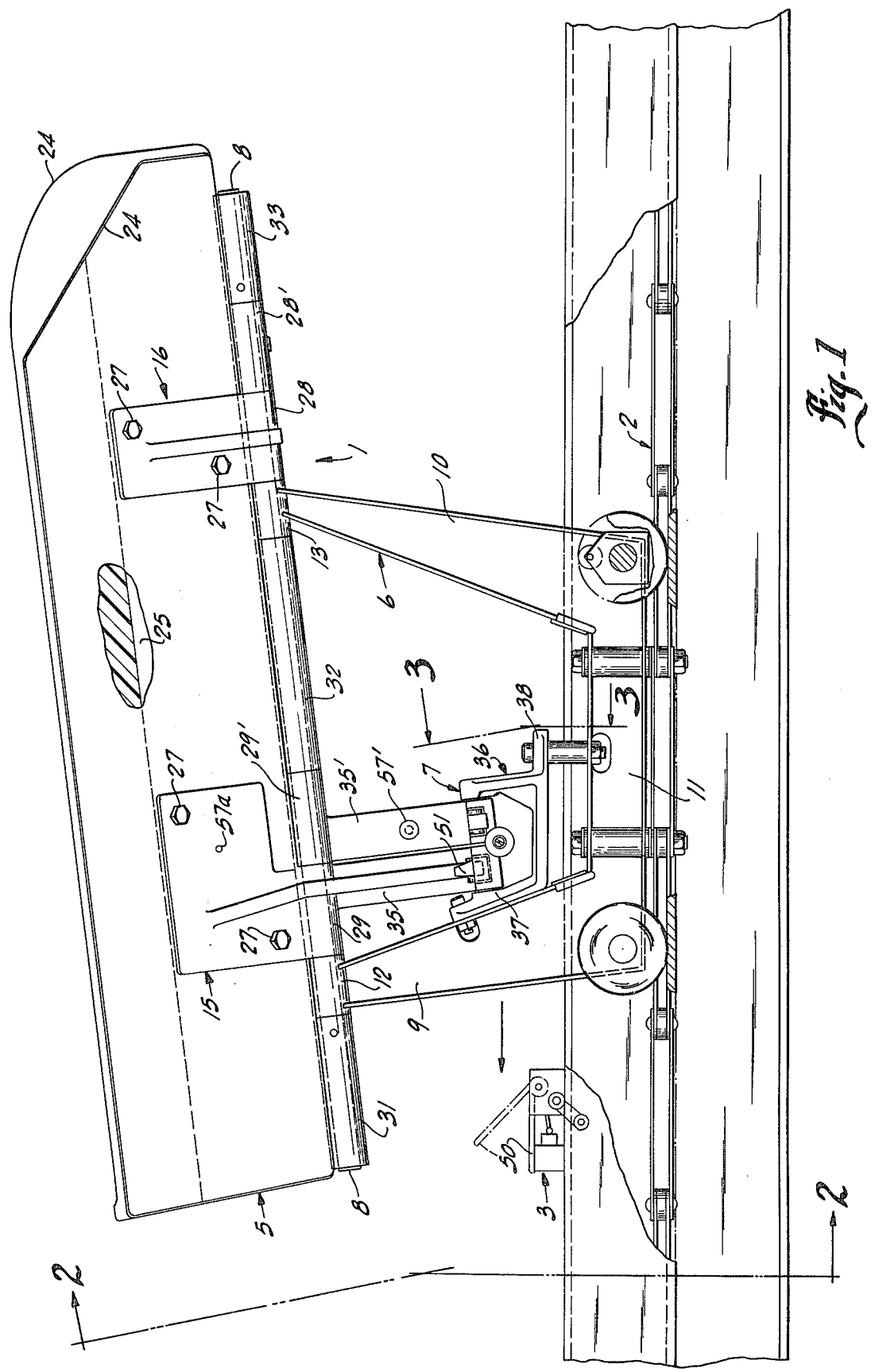
FIG. 1 is a side elevational view of a tray structure constructed in accordance with the present invention.

Referring to the drawings and particularly FIG. 1, a load support or tray unit 1 constructed in accordance with the present invention is interconnected to an articulated drive chain 2. A plurality of the tray units 1 are connected to the drive chain 2 which is located in a horizontal plane and the tray units 1 are sequentially moved in a circulating movement between one or more loading stations, now shown, and a plurality of unloading stations, generally as more fully disclosed in Applicant's previously referred to copending application. At each of the unloading stations, a discharge actuating unit 3 is provided to at least one side of the track for selective coupling to an aligned tray unit 1 which, when actuated, results in an automatic discharge of a load on such tray unit. The present invention is particularly directed to the construction of the tray unit 1 and the interconnected carriage support means and, consequently, no further description of the overall system is presented herein.

Each of the tray units 1 is generally a split tray member including a pair of similar tray members 4 and 5 which are separately and individually pivoted to a carriage unit 6 which is interconnected to the drive chain 2.

Figure 2:
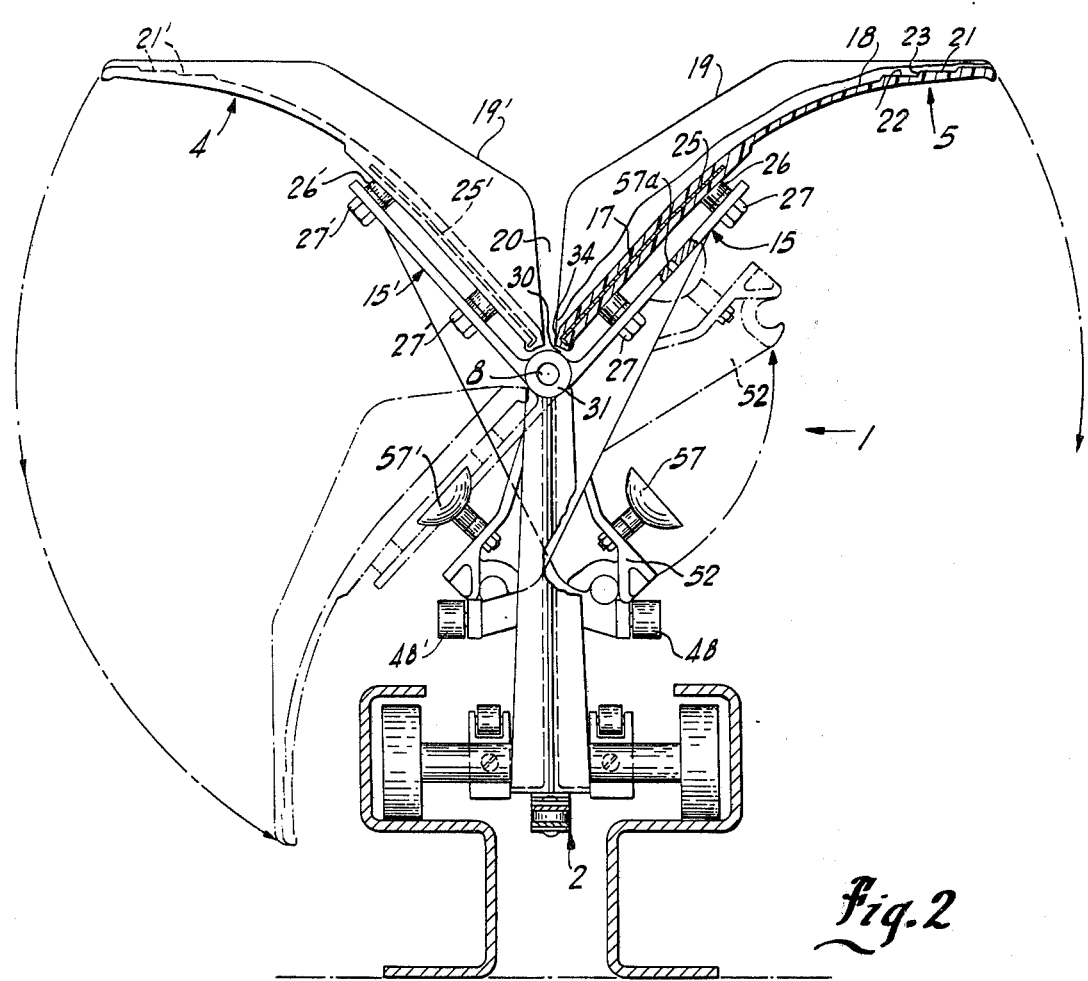
FIG. 2 is a front elevational view of the tray structure shown in FIG. 1 generally taken on line 2—2 of FIG. 1.

Each of the tray members 4 and 5 is located, when in the transport position, to extend upwardly to define a generally V-shaped load supporting structure as most clearly shown in FIG. 2. The tray members are supported in the transport position by a releasable latch mechanism 7 which is selectively actuated by the unit 3 to selectively release either one of the tray members 4 or 5 to drop to a discharge position, as shown in FIG. 2, for the lefthand tray member 4.

Each of the split tray members is similarly formed and pivotally interconnected for individual pivotal movement and the tray member 5 is particularly described with the corresponding elements of the opposite tray member 4 identified by corresponding primed numbers.

More particularly, the tray members 4 and 5 are pivotally mounted on a supporting shaft 8 secured to the top of the generally U-shaped carriage 6. As in Applicant's copending application, the tray members 4 and 5 are preferably mounted inclined to the horizontal to cause the load to move to the forward portion of the tray members 4 and 5. The carriage 6 may be a stamped metal member which includes a forward arm 9 of a somewhat shorter length than the trailing arm 10 and integrally formed with a base 11.

The illustrated stamped carriage 6 is formed from a pair of abutting side-by-side similar members of a channel or U-shaped cross-sections, to form a relatively strong interconnected U-shaped support. Hinge journals 12 and 13 are secured to the upper end of the forward and trailing arms 9 and 10 as by welding or the like, with the axis located in accordance with the desired position of shaft 8. The shaft 8 extends through the journals 12 and 13 and is secured in place as subsequently described. The tray members 4 and 5 are each similarly pivotally mounted on the shaft 8 by a hinge assembly or means including a pair of longitudinally spaced mounting brackets 15 and 16.

Reference to tray member 5 is generally as a plate-like member having a dual inclined planar support surface, which, in the transport position, defines an inner relatively sharp incline or slop portion 17 extending upwardly from the shaft 8 to a second portion 18 of a significantly lesser slope.

The upper end of inclined portion 17 curves outwardly and merges with the outer and lesser inclined portion 18. An end wall 19 is integrally formed on the tray member 5 and projects upwardly to define a stop wall and movable with the tray member 5 for properly locating and supporting of a load in the transport position. In FIG. 1, tray unit 1 moves to the left and wall 19 forms a front wall to stop loads rapidly introduced onto the tray unit 1 and tending to move relatively forwardly. If the load is deposited relatively slowly and tends to move relatively rearwardly, the total unit 1 and carriage 6 may be reversed to locate wall 19 to the rear or trailing end.

The end wall 19 includes an inner edge which projects upwardly with a very slight incline to approximately one-half the depth of the tray and with an outer uppermost edge merging into the center of portion 18 of the tray member 5. The adjacent vertical edges of walls 19 and 19' define a relatively small opening 20 at the leading-most portion of the tray structure. The walls 19 and 19' thereby are constructed to maintain an essentially continuous load supporting or stop means for proper location of a load upon the tray unit 1. The upper edge of the front walls 19 and 19' include intermediate portions which extend outwardly at a greater inclines from the inner edges to a final generally horizontal position aligned with the outer supporting portion 18 of the tray members 4 and 5, as most clearly shown in FIG. 2. The intermediate portions form a generally V-shaped opening located within the configuration of the tray members 4 and 5. Exceptionally long packages on a precending, adjacent tray unit 1 may extend rearwardly into the reduced V-shaped edge portion defined by the front walls of a trailing tray unit 1 and thereby provide the necessary support of extra long packages. The discharge of a load spanning two of the tray units is conveniently accomplished by simultaneous activation of the adjoining tray units.

In accordance with one aspect of the present invention, a stepped or rippled support surface is formed on the portion 18. In the illustrated embodiment of the invention, four steps 21 are illustrated, each of which extends longitudinally along the length of the tray immediately adjacent to the outermost edge portion of the tray member 5. Each of the steps 21 includes a generally flat upper wall 22 located in a plane parallel to the shaft axis with the tray member latched in the transport position and having a slightly inclined, vertical or joining wall 23. In a practical unit, the joining wall 23 of each of the steps 19 was formed with an angle of approximately thirty degrees to the flat supporting surface 22. Applicants have found that the stepped surface provides a highly improved supporting oad structure for large packages which tend to span the V-shaped cavity of the load supporting structure.

The trailing ends of each of the tray members 4 and 5 are flared outwardly as at 24 to permit turning of successive trays 1 around any curve in the track 2.

In the illustrated embodiment of the invention the tray member 5 is shown as formed of a plastic material which may be a suitable reinforced fiberglass. An internal metal insert or plate 25 extends essentially throughout the longitudinal length of the tray member and particularly the inner inclining slop portion 17 of the tray member 4.

The insert 25 includes integrally and threaded bosses 26 which project from the underside of the tray member 4 for securement to the front and rear mounting brackets 15 and 16 to properly mount and locate the tray member 4 on the carriage 6. Each bracket 15 and 16 is similarly firmly mounted to the tray member by a pair of clamping bolts 27.

The rear mounting bracket 16 is a plate-like member having a pair of properly located openings aligned with the insert bushings and clamping bolts 27. The lowermost end of the mounting bracket 16 includes a cylindrical journal 28 secured on the hinge shaft or pin 8 immediately behind the support journal 13 on the trailing arm 10 of the carriage 6.

The forward mounting bracket 15 generally includes a similar plate-like member of somewhat greater axial or longitudinal extent, with appropriately located openings for similar attachment of the bracket 15 to the forward portion of the tray member 5. The forward mounting bracket 15 includes a similar support hinge journal 29 located on the pivot shaft 8 immediately behind the journal 12 on the forward or leading carriage arm 9 with a spacing tube 32 located on shaft 8 between the front journal 29 and the rear arm journal 13. In accordance with the present invention, the hinge pin 8 extends essentially from the forwardmost wall of the tray member 4 to just short of the trailingmost end. End spacer bushings or cylinders 31 and 33 are secured by pins 33a to leading and trailing ends of the carriage hinge pin 8 to form a continuously cylindrical support immediately beneath and adjacent the innermost ends of the two associated tray members 4 and 5. The tray members 4 and 5 are closely spaced from the hinge assembly journals and bushings, as celarly illustrated in FIGS. 1 and 2, such that the opening 30 between the hinge assembly and the tray members is minimal in order to prevent lodging of the load therebetween. As illustrated, the lowermost ends of the tray members 4 and 5 have generally inclined or tapered inner edges 34. When a tray member drops to the discharge position as shown in FIG. 2, the hinge assembly maintains a more or less continuous spanning of the enlarged gap between the innermost ends of the tray members 4 and 5. The curved and inclined surfaces further prevent interference with the discharge of a parcel or load.

The continuous supporting extended hinge assembly has thus been found to provide a reliable means of maintaining the closure of the gap between the two tray members 4 and 5 as they move between the transport and discharge positions, as controlled by the latch mechanism 7 which includes similar depending arms 35 and 35' integrally formed with the brackets 15 and 15'.

The latch mechanism 7 is located within the U-shaped carriage 6 immediately behind the front arm 9. The mechanism 7 includes a U-shaped mounting bracket 36 having an inclined forward wall 37 bolted to the arm 9 and a base portion 38 secured in spaced relation to the base 11 of carriage 6. A pivot pin 39 is secured between the front wall 37 and a back wall 40 of the bracket 36 and pivotally supports a pair of similar latching arms 41 and 41' in longitudinally spaced relation for selective engagement with the latch arms 35 and 35' of the opposite mounting brackets 15 and 15' of the tray members 4 and 5.

Figure 3:
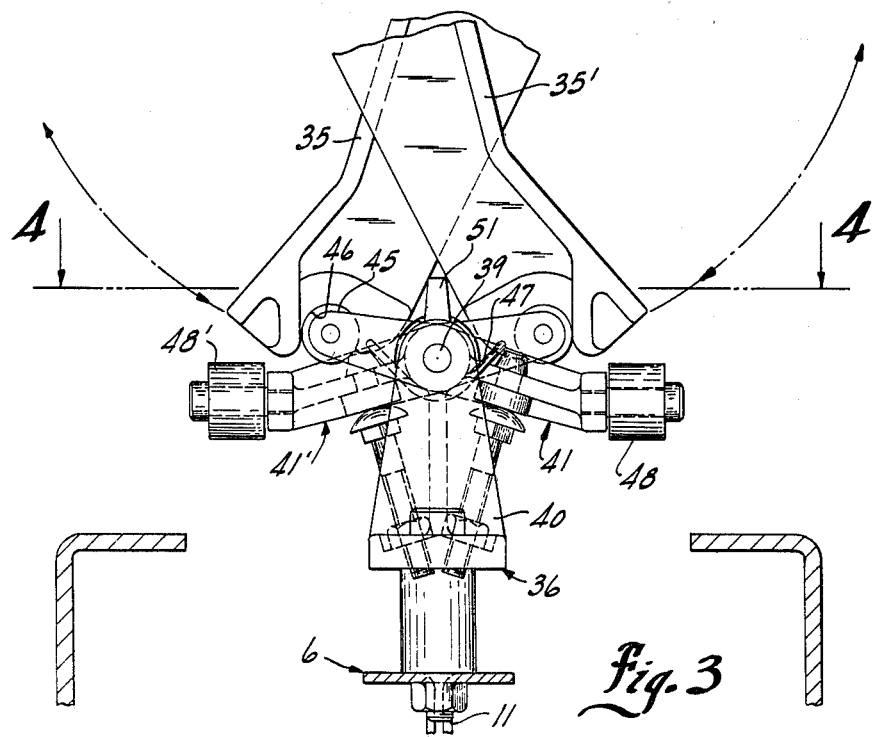
FIG. 3 is a vertical section view taken generally from line 3—3 of FIG. 1.
Figure 4:
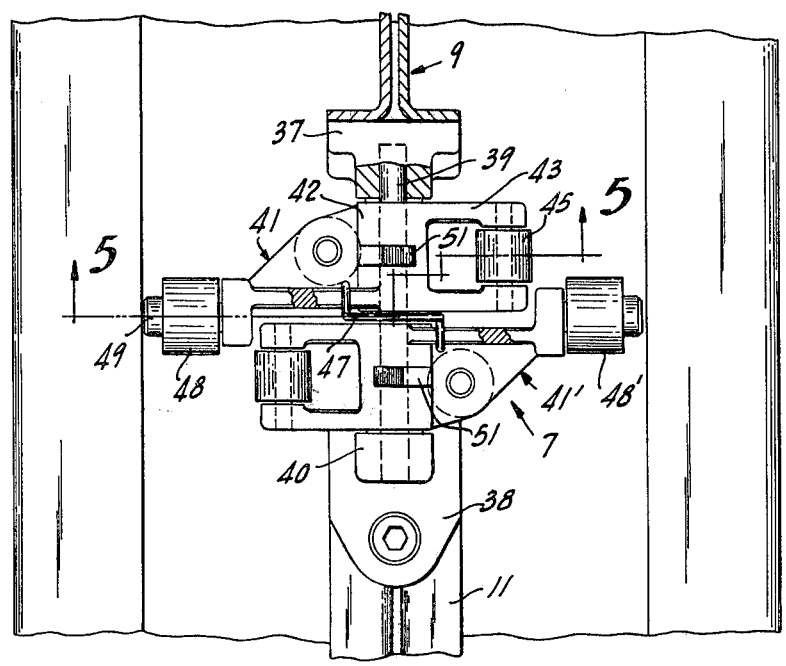
FIG. 4 is a horizontal section taken generally on line 4—4 of FIG. 3 with the interlocking arms structure partially removed to more clearly illustrate the illustrated embodiment of the invention.
Figure 5:
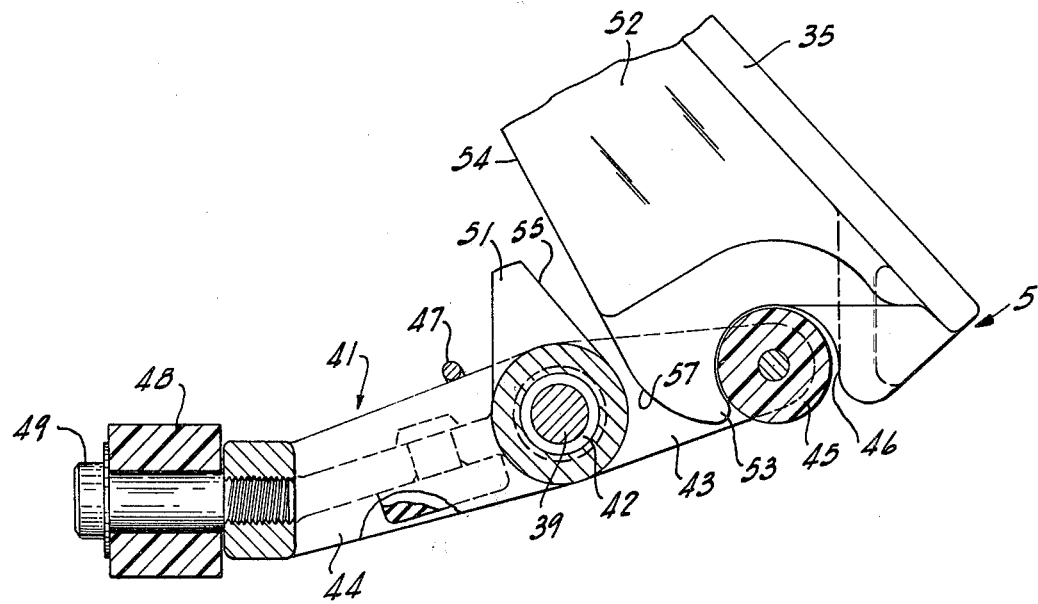
FIG. 5 is an enlarged vertical cross-section taken generally on line 5—5 of FIG. 4.

As most clearly shown in FIGS. 3 – 5, the arm 41 includes a central pivot bushing or hub 42 pivoted on the pivot pin 39 with a latch arm portion 43 extending outwardly laterally of the pivot pin and with an oppositely extending release arm portion 44. In the illustrated embodiment of the invention, the latch arm portion 43 is shown as a bifurcated member having a latch roller 45 rotatably located therein on axis parallel to the pivot pin 39. In the latch position, the roller 45 engages with a downwardly opening notch 46 in the latch arm 35'. The arm 41 is urged into the latching position by a torsion spring 47 wound about the pivot pin 39 and engaging the opposite side or release arm portion 44 to create a resilient pin and notch latch means.

The release portion 44 extends outwardly in the opposite direction and slightly downwardly. A release roller 48 is rotatably secured to the outer end of the arm portion 44 by a suitable connecting pivot pin 49. The roller 48 is located with its axis generally normal to the movement of the tray unit 15 and in alignment with an actuating unit 3 having a pivotally mounted lever 50. When the lever 50 is raised, it is located in the normal path of the roller 48 and forms an inclined ramp over which the roller 48 moves, resulting in a forced pivoting of the latch arm 41 against the tension of the torsion spring 47. The latch roller 45 disengages from the notch 46 on the tray latch arm 35', which then frees the tray member 4 to drop downwardly to the discharge position as shown most clearly in FIG. 2.

In the illustrated embodiment of the invention, the disengagement of the roller 45 from the notch 46 is assisted by forcing of a cam 51 on the arm 41 into engagement with the latch arm 35. As illustrated, the depending latch arm 35 is a strip-like member 52 secured along the edge to the bracket 15 and a member 52 is formed with the release notch 46 having an axis parallel to the latch roller 45. The notch 46 is oriented in the latch position, as shown in FIG. 5, with the inner edge or lip 53 extended slightly horizontally beneath the periphery of roller 45 which must roll outwardly therefrom during the release movement. The inner edges 54 of member 52 extends upwardly from between the spaced roller support portions of the bifurcated arm portion 43 and adjacent to the center pivot hub 42 of the latch arm 41. The cam 51 is a plate-like projection suitably secured to hub 42 in generally coplanar relationship to member 52 with a cam edge 55 slightly spaced from edge 54 of member 52. The initial release rotation of the arm 41 rotates cam 51 and the edge 55 moves into positive engagement with the edge 54 on the latch arm member 35. The continued positive rotation of the arm 41 by unit 3 is transmitted to arm 35 to positively effect disengagement of the roller 45 from notch 46. This contributes a rapid and positive release and is particularly significant when the invention is employed in high speed sorting devices traveling on the order of 400 feet per minute wherein the movement over unit 3 is completed in a very short time.

Thus, in operation a latched tray unit 1 is loaded, automatically or manually, as it moves past a loading station. The tray unit 1 moves at a known speed. When aligned with a selected unloading station, the appropriate actuating unit 3 is actuated to position the ramp-forming lever 50 in the path of the roller 48 or 48', depending on the desired direction of discharge. In FIG. 2, the tray member 4 has been released.

In the final or discharge position, a suction cup bumper 57 on the latch arm 35 engages the mounting bracket 15' of the opposite tray member 5 to provide a slight jogging thereof and thereby facilitate the movement of a load from the tray unit 1. As in Applicant's copending application, a metering hole 57a provides release.

In the tilted position, the planar portion 17 of the tray member 4 forms a continuation of the planar portion 17' of the untilted or unreleased tray member 5. The outer rippled portion 18 drops downwardly to permit the load to drop from the tray structure and in particular with the ripple or steps 21 clearly removed from the desired discharge path.

The tray structure is positively returned to the reset position through any suitable means such as by a reset ramp structure, now shown. Any suitable inclined structure or reset mechanism can engage the underside of the tilted tray member 4 and positively pivot the tray upwardly until the latching notch 46 aligns with the roller 45.

The latch arm 35 will automatically be reset to the latching position as a result of the torsion spring 47. The backside of the latch arm 35 is provided with an inclined cam 57, particularly on lip 53, which engages the roller 45 during reset. This causes a positive reverse or opposite rotation of the lartch arm 41 until the latching notch 46 is again aligned with the latching roller 45. The roller 45 then moves into the notche 46 under the action of the torsion spring 47 to again establish the latch position.

Applicant has found that the present invention provides a very reliable and operative latched tray means for high speed sorters and the like with a positive and reliable movement of the tray structure to the discharge position.

Various modes of carrying out the invention are contemplated as being within the scope of the following claims, particularly pointing out and distinctly claiming the subject matter which is regarded as the invention.

I claim:

1. A support structure for a conveying apparatus, comprising a first tray member, a second tray member, a pivot support means secured to said members and defining a tilt axis for at least one of said tray members extended lengthwise of the tray members, means for holding the members in a transport position, each of said members including a laterally extending support surface extending outwardly and upwardly with a predetermined angular orientation with respect to said tilt axis to define a generally V-shaped load support assembly with said tray members in the transport position, and the upper and outer portion of said support surface including a stepped surface defining at least one generally vertical wall portion between vertically offset portions and extending longitudinally within the support structure.

2. In the support structure of claim 1, wherein each tray member is pivotally supported by said pivot support means, each of said members including a laterally extending support surface including a first portion extending outwardly and upwardly with a predetermined angular orientation with respect to said tilt axis and a second portion extending outwardly and upwardly from said first portion with a significantly lesser angular orientation with respect to the horizontal and terminating in a generally inclined horizontal plane, said stepped surface being formed in said generally inclined horizontal plane.

3. The support structure of claim 1, wherein said pivot support means including a continuous cylindrical member extended the length of the tray members and spanning the gap between the lower edges of the tray members.

4. The support structure of claim 2 wherein said pivot support means includes a pivot shaft extended the length of the tray members, pivot bearings secured to the lower end of each of said tray members and journaled on the shaft, cylindrical spacing members on said shaft establishing a continuous cylindrical support at the lower edges of the adjacent tray members.

5. A support structure for a conveying apparatus, comprising a first tray member, a second tray member, a pivot support means secured to said members and defining a tilt axis for at least one of said tray members extended lengthwise of the tray members, means for holding the members in a transport position, each of said members including a laterally extending support surface extending outwardly and upwardly with a predetermined angular orientation with respect to said tilt axis to define a generally V-shaped load support assembly with said tray members in the transport position, and the upper and outer portion of said support surface including a stepped surface extending longitudinally of the support structure, including a tray carriage having a pair of spaced sleeve bearings, said pivot support means including a top pivot shaft secured in said pair of spaced bearings, said top pivot bar being angularly oriented in a vertical plane with the one end located below the opposite end, said tray members including pivot bearings on said shaft, a plurality of cylindrical spacer members on the shaft to define a continuous cylindrical surface immediately adjacent the lower edges of said tray members.

6. The support structure of claim 5 wherein each tray member is a generally rectangular member pivotally supported by said pivot support means along a lower edge, each of said members including a first planar portion extending outwardly and upwardly with a predetermined angular orientation with respect to said tilt axis and a second portion extending outwardly and upwardly from said first portion with a significantly lesser angular orientation with respect to the horizontal, said stepped surface being formed in the outermost portion of the second portion, each tray member having a front wall including a vertical edge projecting upwardly from the pivot support means to a laterial inclined edge defining a V-shaped opening within the V-shaped load support.

7. The support structure of claim 1, having an end wall means integrally attached to each of said tray members, each of said wall means having an inclined upper wall portion defining a raised V-shaped opening beneath the upper plane of the laterally extending support surfaces.

8. The support structure of claim 1, wherein said means for holding the members in a transport position includes separate latch means for each member, said latch means including a latch member and lever on the support means and tray member and being coupled by a notch and pin type connection means to releasably hold the tray member in the transport position, and said latch member and lever being movable and including interfering members to positively release the corresponding tray member.

9. A support structure for a conveying apparatus, comprising a first tray member, a second tray member corresponding to said first tray member, a pivot support means secured to said members and defining a tilt axis for at least one of said tray members extended lengthwise of the tray members, means for holding the members in a transport position with the lower ends in spaced relation, and said pivot support means including a continuous cylindrical structure located adjacent the lower edges of the tray members to create an essentially continuous supporting transport surface.

10. The support structure of claim 9 wherein said pivot support means includes a pivot shaft extended the length of the tray members, a pair of pivot bearings for each of said tray members located on said shaft, a plurality of spacing members on said shaft to present a continuous cylindrical support at the lower edges of the adjacent tray members.

11. The support structure of claim 9 wherein said pivot support means include a U-shaped tray support carriage including forward and rear support arms with an upper sleeve bearing, a top pivot shaft secured in said sleeve bearing, said tray members including sleeve bearings on said shaft, a plurality of cylindrical spacer members on the shaft to define a continuous cylindrical surface immediately adjacent the lower edges of said tray members.

12. The support structure of claim 9 wherein each of said tray members includes an end wall means integrally attached to each of said tray members, each of said end wall means having an inclined upper wall portion defining a raised V-shaped opening beneath the upper plane of the laterally extending support surfaces.

13. A support structure for a conveying apparatus, comprising a first tray member, a second tray member, a pivot support means secured to said members and defining a tilt axis for at least one of said tray members extended lengthwise of the tray members, means for holding the members in a transport position, said pivot support means including a continuous cylindrical structure located adjacent the lower edges of the tray members to create an essentially supporting transport surface, a U-shaped carriage having forward and rear arms projecting upwardly from a base and wherein said means for holding the members in a transport position includes a separate latch means for each member, a releasably mounted common support bracket for said latch means including a pivot pin means, each of said latch means including a laterally extending latch member secured to the corresponding tray member and a latch lever secured to the pivot pin means, said latch member and layer being coupled by a notch and pin type connection means to releasably hold the tray member in the transport position, and said latch lever being movable to release the latch member and corresponding tray member.

14. The support structure of claim 13 wherein said latch members having a plate-like portion secured to the tray member and aligned with the latch member of the opposite tray member, a resilient means secured to each latch member engaging the opposite plate-like portion in response to the release of a tray member to mechanically jog the non-released tray member.

15. A support structure for a conveying apparatus, comprising a first tray member, a second tray member, a pivot support means secured to said members and defining a tilt axis for at least one of said tray members extended lengthwise of the tray members, means for holding the members in a transport position, said pivot support means including a continuous cylindrical structure located adjacent the lower edges of the tray members to create an essentially supporting transport surface, said means for holding the members in a transport position includes separate latch means for each member, said latch means including a latch member and lever on the support means and tray member and being coupled by a notch and pin type connection means to releasably hold the tray member in the transport position, and said latch member and lever being movable and including interfering members to positively release the corresponding tray member.

16. A tray unit for a conveying apparatus, comprising a tray element having a mounting side and a first planar support portion extending laterally therefrom and a second planar support portion projecting outwardly at an angle from said first planar support portion, the outer portion of the second support portion including a plurality of longitudinally extended and vertically offset steps to define offset load supporting surfaces joined by generally vertical wall portions.

17. The tray unit of claim 16 having a pivot support means secured to the mounting side of the element and located adjacent the edge of the mounting side on the first planar support portion.

18. The tray unit of claim 17 wherein said extended steps are parallel to the axis of the pivot support means and include walls parallel to each other.

19. The tray unit of claim 16, having an end wall means integrally attached to said tray element, said wall means having an edge extending from the mounting side to an inclined upper edge extending outwardly to the second portion, a pair of said elements producing a raised V-shaped opening beneath the upper plane of the laterally extending support surfaces.

* * * * *

UNITED STATES PATENT AND TRADEMARK OFFICE
CERTIFICATE OF CORRECTION

PATENT NO. : 3,945,485  
DATED : March 23, 1976  
INVENTOR(S) : RICHARD L. SPEAKER Page 1 of 2

It is certified that error appears in the above-identified patent and that said Letters Patent are hereby corrected as shown below:

| | | | |
|---|---|---|---|
| In the ABSTRACT, | Line | 5, | at the beginning of the line, cancel "dividuall" and insert --- dividually ---; |
| Column 3, | Line | 13, | before "shown" cancel "now" and insert --- not ---; |
| Column 4, | Line | 4, | after "sharp" cancel "inclin or slop" and insert --- inclined or sloped ---; |
| Column 4, | Line | 32, | at the beginning of the line cancel "inclines" and insert --- incline ---; |
| Column 4, | Line | 38, | after "a" cancel "precending" and insert --- preceding ---; |
| Column 4, | Line | 61, | at the beginning of the line cancel "oad" and insert --- load ---; |
| Column 5, | Line | 2, | before "portion" cancel "slop" and insert --- sloped ---; |
| Column 5, | Line | 38, | before "illustrated" cancel "celarly" and insert --- clearly ---; |

UNITED STATES PATENT AND TRADEMARK OFFICE
CERTIFICATE OF CORRECTION

PATENT NO. : 3,945,485
DATED : March 23, 1976
INVENTOR(S) : RICHARD L. SPEAKER

It is certified that error appears in the above-identified patent and that said Letters Patent are hereby corrected as shown below:

| | | | |
|---|---|---|---|
| Column 6, | Line 37, | | before "member" insert --- narrow plate-like extension 53 thereof. The lower end of the ---; |
| Column 6, | Line 44, | | at the beginning of the line cancel "edges" and insert --- edge ---; |
| Column 7, | Line 17, | | before "shown" cancel "now" and insert --- not ---; |
| Column 7, | Line 28, | | before "arm" cancel "lartch" and insert --- latch ---; |
| Column 7, | Line 30, | | before the numeral "46" cancel "notche" and insert --- notch ---; |
| Column 8, CLAIM 6 | Line 51, | | at the end of the line cancel "laterial" and insert --- lateral ---; |
| Column 9, CLAIM 13 | Line 52, | | before "being" cancel "layer" and insert --- lever ---; |

Signed and Sealed this

Twentieth Day of July 1976

[SEAL]

Attest:

RUTH C. MASON
*Attesting Officer*

C. MARSHALL DANN
*Commissioner of Patents and Trademarks*